Oct. 16, 1928.

E. WIRZ ET AL 1,687,999

CONTROLLER CONSTRUCTION

Filed May 5, 1927

Inventors:
Ernst Wirz
Arnold Haller
Karl Kuntze
By Cromwell, Greist & Warden
Attorneys Patented Oct. 16, 1928.

1,687,999

UNITED STATES PATENT OFFICE.

ERNST WIRZ, ARNOLD HALLER, AND KARL KUNTZE, OF BADEN, SWITZERLAND, ASSIGNORS TO AKTIENGESELLSCHAFT BROWN BOVERI & CIE., OF BADEN, SWITZERLAND, A JOINT-STOCK COMPANY OF SWITZERLAND.

CONTROLLER CONSTRUCTION.

Application filed May 5, 1927, Serial No. 189,069, and in Germany April 3, 1926.

This invention relates to electric controllers of the type in which a plurality of contact-making elements are actuated in the desired sequence by suitable cam disks mounted on a control shaft. Such controllers are largely used for tram-cars and light motor rail cars. The main features of the invention are, however, capable of application to other kinds of switching equipment.

One of the objects of the present invention is the provision of a controller of the foregoing character which can be quickly and cheaply assembled.

Another object is the provision of a method of mounting the cams in such controllers which allows of rapid and accurate adjustment of their relative angular positions during assembly.

Another object is to simplify the construction of such controllers by the provision of components which can be conveniently produced in large quantities.

Other and further objects of the invention will be pointed out or indicated hereinafter, or will be obvious to one skilled in the art upon an understanding of the present disclosure.

In the accompanying drawing forming a part of this specification I show, by way of example, one form of construction embodying the invention, but it is to be understood that this is not to be construed in any fashion as having the effect of limiting the claims short of the true and most comprehensive scope of the invention in the art.

Controllers of the cam-operated type are largely used for moderately heavy duty work where reliability is of great importance such as on tramways and light railways. Such a controller comprises a plurality of cam disks mounted on a shaft and cooperating with suitable current make-and-break devices. The cam disks are made of insulating material and are shaped and arranged on the shaft to give the particular sequence of switching operations desired. Controllers contructed on this plan are usually provided with shafts of square or polygonal section and the cams are secured in position simply by making them a tight fit on the shaft. The disadvantage of this method is that each cam must be specially cut for a predetermined position on the shaft, and no adjustment is possible during or after assembly. Moreover the strength of cams mounted in this way is limited. The present invention overcomes these drawbacks in an exceedingly simple and effective manner. The cams are not mounted directly on the shaft, but on polygonal metal bushings which are smooth bored and held on the circular-section controller shaft by keys or pins.

Figure 2:
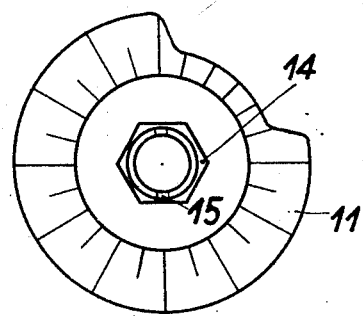
Fig. 2 is a plan view of one of the operating cam disks.
Figure 3:
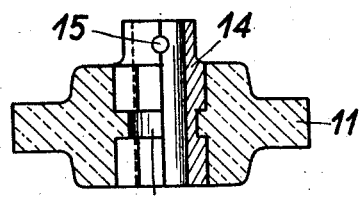
Fig. 3 is a sectional view of the cam disk shown in Fig. 2.

The nature of the invention may be most readily ascertained by reference to the example in the drawing. Figs. 2 and 3 represent in plan and vertical section respectively a cam disk embodying the invention. The reference numeral 11 designates the cam disk of insulating material which is molded round a hexagonal metal bushing 14. On the outside of this bushing and about half way along its length is a deep circumferential groove 18 into which the material forming the cam is forced during the molding process. As a result the cam disk cannot move axially relative to the bushing even though it should become loose on the same, and the hexagonal section of the bushing is an effective bar to circumferential slipping. The circular bore of the bushing is made an easy fit on the controller shaft, and the cams are positioned and fixed by means of taper or split pins which pass transversely through both shaft and bushing. The holes in the bushing for receiving these pins are shown at 15 in Figs. 1 and 2.

Figure 1:
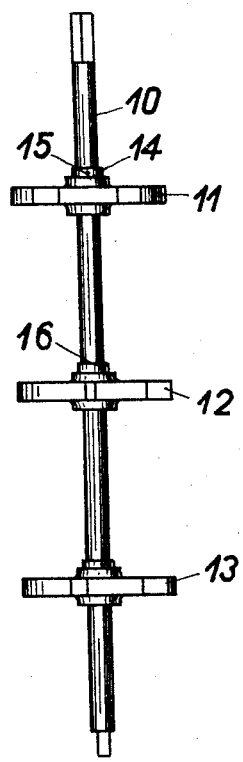
Fig. 1 shows an elevational view of a controller shaft embodying the invention.

An example of a controller shaft with three cam disks mounted thereon is illustrated in Fig. 1 of the drawing. The shaft 10 is of round section and is shouldered at the bottom and squared at the top to take a control wheel or handle. The cams are slipped on in the correct order, adjusted for position and secured by drilling through the shaft and inserting a pin as shown at 16. To facilitate accurate positioning of the cams, graduation marks are stamped on the faces of the disks during molding; these can be seen in Fig. 2.

It will be clear that cams of this improved design can be very expeditiously assembled and secured on the controller shaft, the graduations ensuring that proper angular relationship is preserved.

What we claim is:

In controller construction of the character described, a bushing provided with a bore for receiving an operating shaft, and material molded about a portion of said bushing and shaped to provide a cam-element, the outer surface of said bushing portion providing with the set material a direct interlocking connection between said bushing and said cam-element holding the same against both rotational and axial movements with respect to each other, another portion of said bushing extending axially beyond said cam-element and being operable to accommodate retaining means for holding such assemblage in fixed position with respect to the operating shaft therefor.

In testimony whereof we have hereunto subscribed our names at Zurich, Switzerland, this 12 day of April A. D. 1927.

ERNST WIRZ.
ARNOLD HALLER.
KARL KUNTZE.